US008561035B2

(12) United States Patent
Chicherin et al.

(10) Patent No.: US 8,561,035 B2
(45) Date of Patent: Oct. 15, 2013

(54) METHOD AND SYSTEM TO DISCOVER POSSIBLE PROGRAM VARIABLE VALUES BY CONNECTING PROGRAM VALUE EXTRACTION WITH EXTERNAL DATA SOURCES

(75) Inventors: Sergej Chicherin, Moscow (RU); Nikolai A. Joukov, Hawthorne, NY (US); Birgit Pfitzmann, Hawthorne, NY (US); Marco Pistoia, Hawthorne, NY (US); Vasily Tarasov, Hawthorne, NY (US); Takaaki Tateishi, Kanagawa-ken (JP); Norbert G. Vogl, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 12/553,486

(22) Filed: Sep. 3, 2009

(65) Prior Publication Data

US 2011/0055806 A1 Mar. 3, 2011

(51) Int. Cl.
*G06F 9/44* (2006.01)
*G06F 9/45* (2006.01)
(52) U.S. Cl.
USPC ........... 717/130; 717/124; 717/131; 717/141; 717/143; 717/169; 717/170; 714/37; 714/39; 709/223; 709/224; 709/225; 709/226

(58) Field of Classification Search
None
See application file for complete search history.

(56) References Cited

U.S. PATENT DOCUMENTS

| | | | |
|---|---|---|---|
| 6,427,228 B1 * | 7/2002 | Wigger | 717/111 |
| 7,395,322 B2 * | 7/2008 | Harvey et al. | 709/220 |
| 2003/0191769 A1 * | 10/2003 | Crisan et al. | 707/100 |
| 2004/0049742 A1 * | 3/2004 | Yokoyama et al. | 715/530 |
| 2004/0073539 A1 * | 4/2004 | Dettinger et al. | 707/3 |
| 2004/0088308 A1 * | 5/2004 | Bailey et al. | 707/100 |
| 2006/0161768 A1 * | 7/2006 | Baissus et al. | 713/152 |
| 2007/0168987 A1 * | 7/2007 | Vetillard et al. | 717/126 |
| 2008/0046868 A1 * | 2/2008 | Tsantilis | 717/136 |
| 2008/0189289 A1 * | 8/2008 | Dettinger et al. | 707/10 |
| 2009/0157859 A1 * | 6/2009 | Morris | 709/223 |
| 2010/0076737 A1 * | 3/2010 | Boddy et al. | 703/6 |
| 2011/0078665 A1 * | 3/2011 | Gulwani et al. | 717/131 |

* cited by examiner

*Primary Examiner* — Henry Tsai
*Assistant Examiner* — Michael Sun
(74) *Attorney, Agent, or Firm* — Scully, Scott, Murphy & Presser, P.C.; Louis J. Percello, Esq.

(57) ABSTRACT

A system and method of discovering one or more program variable values may extract an abstract interpretation of a program variable used in a computer program, locate installation-specific repositories associated with the computer program, parse the located installation-specific repositories and extract one or more configuration parameters, and substitute the one or more configuration parameters into the extracted abstract interpretation.

17 Claims, 4 Drawing Sheets

METHOD AND SYSTEM TO DISCOVER POSSIBLE PROGRAM VARIABLE VALUES BY CONNECTING PROGRAM VALUE EXTRACTION WITH EXTERNAL DATA SOURCES

BACKGROUND

The present disclosure generally relates to computer system applications, and more particularly, to discovering possible program variable values by connecting program value extraction with external data sources.

There are reasons why one may want to know what values a variable in a program can possibly take, either generally or at a specific point of program execution. One example is that one wants to ensure that the variable will always remain in a certain numeric range. Another example is that the variable is a string variable used to construct an SQL database query, and one wants to ensure that the result is always a valid SQL string. Yet another example is that the variable is the name of an external resource, such as a database, file, or message queue used, and one wants to find out what actual resources the variable might refer to.

While static analysis may be used to analyze static programs, as long as only the program code is considered, the value of many variables may not be known, or only partially known. Besides static analysis with automated tools, manual code inspection may be considered an option. However, modern programs are often large and complex. Typically, programs are obtained by assembling various components at runtime. As a result, it is very difficult to perform a manual analysis, and it is likely to be imprecise.

Run-time program monitoring can reveal typical values of program variables, but one is never sure that one has seen all possible values. For instance, it may not detect values that only occur under certain special conditions, such as partial failures, or after certain special inputs, if these special conditions do not occur during the monitoring time or those special inputs are not passed during the monitoring phase. Furthermore, run-time program monitoring is not always possible or ideal, for instance, because of security concerns or performance impact, or because one cannot introduce a monitor into an existing runtime environment.

BRIEF SUMMARY

A method and system for discovering one or more program variable values are provided. The method, in one aspect, may include extracting an abstract interpretation of a program variable used in a computer program and locating installation-specific repositories associated with the computer program. The method may also include parsing the located installation-specific repositories and extracting one or more configuration parameters and substituting the one or more configuration parameters into the extracted abstract interpretation.

A system for discovering one or more program variable values, in one aspect, may include a static analysis module operable to execute on the processor and further operable to extract an abstract interpretation of a program variable used in a computer program. A resource location searcher module may be operable to locate installation-specific repositories with the computer program. A configuration evaluator module may be operable to parse the located installation-specific repositories and extract one or more configuration parameters, and a substitution module may be operable to substitute the one or more configuration parameters into the extracted abstract interpretation.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

A method and system of the present disclosure may discover possible program variable values. Because program variables or other variables that they depend on may be initialized at runtime from the environment of the program, a static analysis is often not enough to determine or discover such values. In such cases, by analyzing the program environment, for instance, in addition to using a static analysis, the precision of the static analysis may be improved as a result of discovering the possible values of program variables beyond what is possible based on static analysis of the program code alone. As an example, for production-level applications, programs are run for a long time or repeatedly in the same environment, and parts of their environment are static during this time, in particular configuration files or databases and the initial command-line input. Analyzing the environment in addition to the static analysis may produce more precise results.

It is not generally known what precise set of values a variable might assume in a program or at a specific point in the program. A method and system of the present disclosure solves this problem by safely approximating this set of values that a variable might take, i.e., to find a superset of these values, such that the really possible values are in the superset, while trying to have as few values as possible in the superset that are not really possible values. We specifically consider this problem in the context of a program running in a certain environment, e.g., of long-running applications such as a banking application, a hospital application, and others. In such a context, certain variables are initialized at certain points in the program from fixed values of the environment, i.e., from installation-specific arguments, e.g., from command-line parameters that were given when the program (the application) was started, or from configuration or property or initialization files, or a configuration database, or a registry, or an environment variable. In such cases, the values of these and many other variables may be much further restricted than by analyzing only the program code alone. Even custom-made applications that are only deployed in one place frequently have configuration files or other dependencies on the environment to run in development, test and production environments without code changes. The problem we solve is to safely approximate the set of possible values of variables in these situations such that the superset derived by the safe approximation is, in general, much smaller than a superset found by methods that only analyze the code.

We disclose a method and a system to discover possible program variable values by connecting program values extraction with external data sources. The method and a system of the present disclosure in one embodiment analyze the possible values that certain variables can take by combining static program analysis technologies and extraction of installation-specific or configuration-specific parameters or the like. The set of possible values of a variable may refer to all values this variable may take. More commonly, the set of possible values refers to the values the variable can take at certain points in a program, in other words at specific program statements in the code, e.g., when the value of a numeric variable is output, or the string in a string variable used as an SQL query to a database, or when the string in another string variable is used as a name of a file to open, or a database to connect to.

In particular, static program analysis technologies can reveal that the value of a variable is derived from an externally defined parameter such as a command-line argument or configurational parameter defined in a configuration file or a configurational database or the like. In one embodiment, a method and a system of the present disclosure extract the corresponding parameters by looking at one or more or combinations of installation-specific command-line arguments, configuration files, and databases or the like. In one embodiment, this may be accomplished by modeling known execution environments such as application servers or language interpreters and discovering installation-specific variable values.

For instance, a program "sampling.p1" might contain the following statements.

```
duration = ARGV[2];
rate = ARGV[3];
...
samples = duration * rate;
```

Here two variables, "duration" and "rate", are initialized from the two command line arguments ARGV[2] and ARGV[3]. Later, a variable "samples" is set to the product of these two variables. The notation "ARGV" ("argument vector") for command-line arguments is known in multiple programming languages such as Java™, Perl, and C++. In one embodiment, static analysis will derive that the value of the variable "samples" after the last statement of this program fragment is the product of two variables ARGV[2] and ARGV[3], and analysis of the environment gives us the values of these arguments. On a UNIX-like system, this analysis may, e.g., be done by running the "ps" command, which lists running processes with the commands that started them, and by looking for the process (or processes) corresponding to the program currently analyzed in the output of the "ps" command. For instance, if this command contains the values 7 and 12 as the second and third argument, respectively, we can substitute them into the product and we obtain that the value of the variable "samples" after the above program statement in this environment is 84.

As an example of the use of configuration files, Java™ programs use installation-specific properties that are resolved at run time by calling standard API functions. The method and system in one embodiment of the present disclosure may utilize static program analysis technologies to reveal that a given program uses a database whose name is derived by calling this API to resolve a particular variable name. An example is a program "DB_use.java" with the following four statements, which might be in different parts of the program, e.g., in subclasses:

```
Properties props = new Properties( );
props.load(getClass( ).getResourceAsStream("settings.properties"));
String database_name = props.getProperty("WWW_DB");
Connection cn = DriverManager.getConnection(database_name, "admin",
"pswd");
```

The goal in this example is to find out to which database the program connects in the last of these four statements, and thus to find the possible values of the variable "database_name" at this point in the program. The static analysis will find that this name is set in the third statement, and that the object "props" used there is initiated in the second statement by loading from an external file "settings.properties". To resolve this, the method and system of the present disclosure in one embodiment may look for the first file "settings.properties" located in the Java™ classpath directories, parse them, and locate the WWW_DB variable definition. The properties files have a standardized format so that it is possible to search them for this definition. The line to search for in this example may have one of several formats, e.g., we may find:

WWW_DB=Catalogue1

If this is the only definition of the parameter WWW_DB in a file named "settings.properties" in the identified locations, the result is that the connect statement refers to the database Catalogue1. In case that there are several such definitions in one file, e.g., also WWW_DB=Catalogue2, the result may be the last such definition, because that is how the Java™ virtual machine will also make its decision.

The following examples further illustrate the variety of how string values may be extracted from files of different types in the environment of the program.

The first sample shows another way of using a properties file (*.properties): the following "wsserver.properties" file contains a database name:

```
######################################
# DATABASE configuration       #
######################################
db.eskb.database=eskb
db.eskb.maxcon=5
db.eskb.mincon=2
```

Here is code that extracts this database name:

```
// read db.eskb.database property value from the properties file
Properties databaseproperties = new Properties( );
databaseproperties.load(new FileInputStream("wsserver.properties"));
System.out.println("Database name: "
        + databaseproperties.getProperty("db.eskb.database"));
```

Extended markup language (XML) files may also be used for storing application parameters. For example, managed variables for IBM WebSphere Portal Server are stored in a file "variables.xml":

```
<?xml version="1.0" encoding="UTF-8"?>
<variables:VariableMap xmi:version="2.0"
xmlns:xmi="http://www.omg.org/XMI"
xmlns:variables="http://www.ibm.com/websphere/appserver/
schemas/5.0/variables.xmi"
xmi:id="VariableMap_1">
    <entries xmi:id="VariableSubstitutionEntry_1184341712500"
symbolicName="WMM_CONFIG_PATH"
value="${WPS_HOME}/wmm"
description="The filesystem path to WebSphere Member
Manager WMM configuration file wmm.xml."/>
</variables:VariableMap>
```

For extracting a specific XML node, the XPath query language may be used:

```
// read symbolicName attribute value from xml file
DocumentBuilder builder =
(DocumentBuilderFactory.newInstance( )).newDocumentBuilder( );
Document xmldocument = builder.parse("variables.xml");
XPath xpath = XPathFactory.newInstance( ).newXPath( );
XPathExpression xPathExpression =
xpath.compile("//entries[@symbolicName]");
NodeList nodes = (NodeList) xPathExpression.evaluate(xmldocument,
         XPathConstants.NODESET);
for (int i = 0; i < nodes.getLength( ); i++) {
    System.out.println("xml file have <entries> element
which symbolicName atribute equals
" + nodes.item(i).getNodeValue( ).replaceAll("\\$\\{WPS_HOME\\}",
System.getProperty("WPS_HOME")));
```

In the example above, "symbolicName" attribute value references "WPS_HOME" environment variable. To obtain the final value of this attribute "WPS_HOME" is replaced by the specific environment value.

It is also possible to extract values from other file formats by using regular expressions and other techniques. Here is an ".ini" file fragment containing an LDAP server address:

```
[Notes]
...
LDAPNoAutoStartRepairDIT=1
LDAPSERVER=ldap://bluepages.ibm.com:389
LDAPSERVERSSL=ldap://bluepages.ibm.com:0
...
```

The corresponding code is:

```
// read LDAPSERVER parameter value from ini file
// slightly different format from properties, Java ™ does not have
// built-in parser
FileReader iniFileReader = new FileReader("notes.ini");
BufferedReader iniReader = new BufferedReader(iniFileReader);
String line;
while ((line = iniReader.readLine( )) != null) {
    String[ ] pair=line.split("=", 2);
    // split each line for pair strings before '=' and after
    if (pair[0].equals("LDAPSERVER")) {
        System.out.println("ldap server url:"+ pair[1]);
    }
}
iniFileReader.close( );
```

Figure 1:
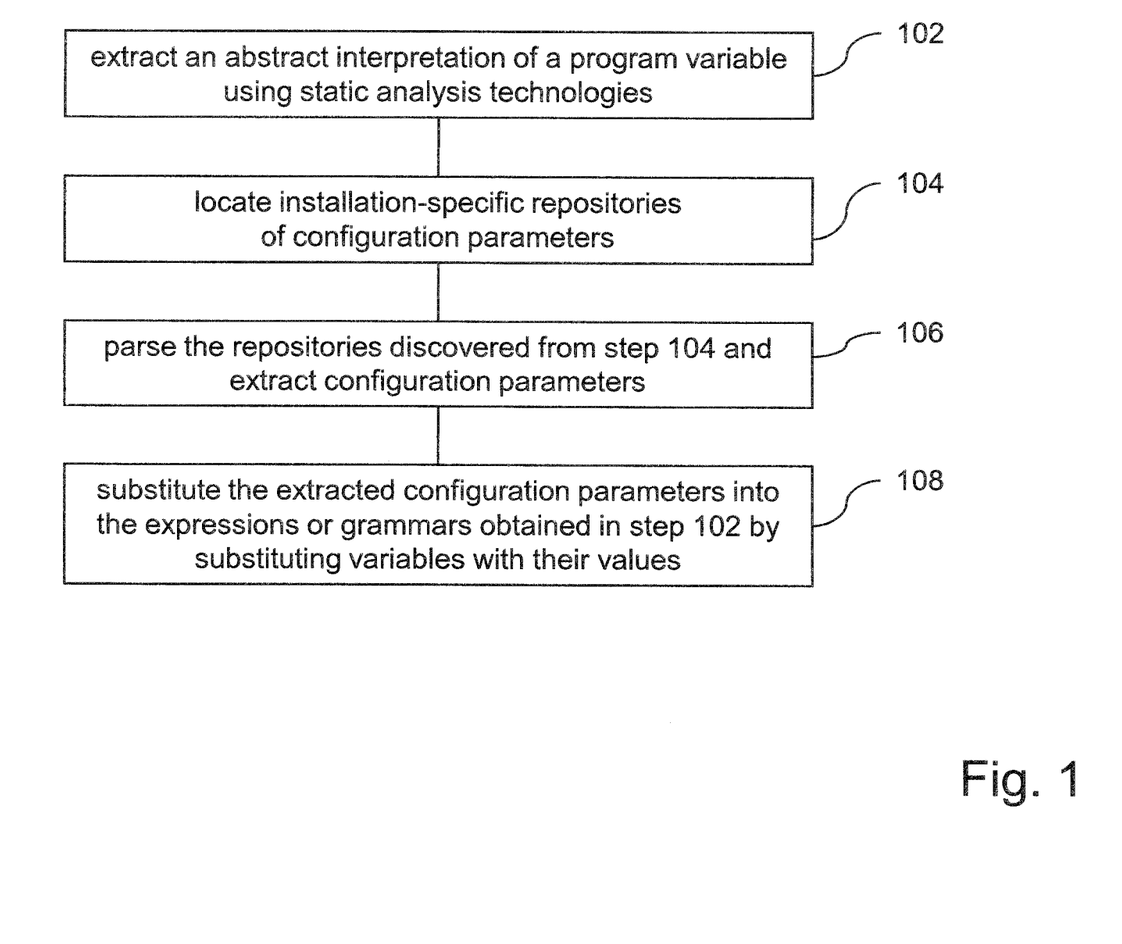
FIG. 1 is a flow diagram illustrating a method of the present disclosure in one embodiment.

FIG. 1 is a flow diagram illustrating a method of the present disclosure in one embodiment. At 102, an abstract interpretation of a program variable is extracted, for example, using static analysis technologies. Abstract interpretation refers to an expression that has not been completely resolved into definitive values. For example, for a numeric variable, the method and system in one embodiment may obtain an arithmetic expression with certain inputs from the environment still as variables. For instance, in the first example above, "ARGV[2]*ARGV[3]" is an abstract interpretation for "samples" at the end of Step 102. For a string variable, the method and system in one embodiment may obtain a regular expression or a grammar that comprises all the possible values but contains certain inputs from the environment still as parameters. An example is the expression "wwwroot+'/contact.html'" where "wwwroot" is a property like "database_name" in the example above, "+" denotes concatenation, and '/contact.html' is a string constant. In a method that only analyzes the program code, "wwwroot" is unknown, e.g., represented by the string wildcard "*", and thus the overall expression becomes "*+'/contact.html'", while the present method and system aim to derive the set of values that "wwwroot" can assume in the next steps.

At 104, the method may include locating installation-specific command-line arguments, configuration files, databases, and other similar repositories of configuration parameters in the environment of the program, i.e., on the computer system where the program is running or installed to be run, and potentially on other computers, e.g., a remote database.

In one embodiment, locating installation specific parameters of step 104 may be performed by using knowledge about the environment and/or execution environment. For instance, by running commands such as the "ps" command on an underlying UNIX operating system, the run-time command line of the program can be observed. For our example program "sampling.p1", the corresponding line in the ps output on certain operating systems might look like (broken into several lines for readability):

```
usr1 1001   1002   0   Jan 10   - 0:49/usr/bin/perl
/usr/applications/sampling.pl outfile.txt 7 12.
```

Depending on how the program to analyze is given to our method, we might search the overall ps output just for the program name "sampling.p1", or know that we are analyzing the program of this name in directory "/usr/applications" or, in case there might be several running instances of this program, either additionally know that we look for an instance run by user "usr1" or started at "Jan 10". Thus the above line can be found in the output of the ps command. The line is parsed to yield that ARGV[2] and ARGV[3] from the abstract interpretation are 7 and 12. If we don't know details and find several suitable lines in the ps output, we can still refine the abstract interpretation with all possible values.

Similarly, the output from the "ps" command can help in locating all the Java™ program property files in the places where the Java™ Virtual Machine and the Java™ Runtime Environment look for them. For instance, consider this line from a ps output for a Java™ program (broken into several lines for readability):

```
svcagent 36252 19448   0 01:28:42   - 2:59 java
-classpath/usr/svc/sa.jar:/usr/svc/:/usr/svc/properties:
com.ibm.DB_use
```

In this case, the configuration file "settings.properties" from the example is searched for in the directories "<CLASS- PATH>/com/ibm" where CLASSPATH iterates over /usr/svc/sa.jar, /usr/svc/, and /usr/svc/properties.

As another example, the run-time command line can help find values of program-specific variables or configuration files and configuration databases of application servers such as WebSphere™ Application Server where program-specific variables are frequently defined.

```
was 38384   1   0 Jan 25   - 24:04 /usr/WebSphere/DeploymentManager/java/bin/java
-Dwas.status.socket=64940
-Xbootclasspath
/p:/usr/WebSphere/DeploymentManager/java/jre/lib/ext/ibmorb.jar:/usr/WebSphere/Deployment
Manager/java/jre/lib/ext/ibmext.jar
-classpath
/usr/WebSphere/DeploymentManager/properties:/usr/WebSphere/DeploymentManager/properties
:/usr/WebSphere/DeploymentManager/lib/bootstrap.jar:/usr/WebSphere/DeploymentManager
/lib/j2ee.jar:/usr/WebSphere/DeploymentManager/lib/lmproxy.jar:/usr/WebSphere/Deployment
Manager/lib/urlprotocols.jar
-Dws.ext.dirs=/usr/WebSphere/DeploymentManager/java/lib:/usr/WebSphere/DeploymentManager
/classes:/usr/WebSphere/DeploymentManager/classes:/usr/WebSphere/DeploymentManager
/lib:/usr/WebSphere/DeploymentManager/lib/ext:/usr/WebSphere/DeploymentManager
/web/help:/usr/WebSphere/DeploymentManager/deploytool/itp/plugins/com.ibm.etools.ejbdeploy
/runtime
-Dserver.root=/usr/WebSphere/DeploymentManager
-Ddb2j.system.home=/usr/WebSphere/DeploymentManager/cloudscape
-Duser.install.root=/usr/WebSphere/DeploymentManager
-Dcom.ibm.itp.location=/usr/WebSphere/DeploymentManager/bin
-Dwas.install.root=/usr/WebSphere/DeploymentManager
-Djava.security.auth.login.config=/usr/WebSphere/DeploymentManager/properties/wsjaas.conf
-Djava.security.policy=/usr/WebSphere/DeploymentManager/properties/server.policy
com.ibm.ws.bootstrap.WSLauncher
com.ibm.ws.runtime.WsServer
/usr/WebSphere/DeploymentManager/config
esvcsp08Network esvcsp08Manager dmgr
```

As a further example, the run-time command line may also be obtained through use of (Java™ Management Extensions (JMX) and/or Simple Network Management Protocol (SNMP). For Java™ programs running on a Java™ Virtual Machine which is JMX-enabled, the "java.lang.management.RuntimeMXBean.getInputArguments( )" returns a list of command line arguments. For java programs running on an SNMP-enabled JVM, the jvmRTInputArgsTable returns the same. Some classpath information may also be obtained through JMX and SNMP.

In addition to being specified explicitly on the command line, classpaths may also be specified elsewhere such as in ANT (Apache's "Another Neat Tool") files through environment variables, and Class-Path: header lines within JAR (Java™ Archive) file manifests. Custom java classloaders, which may or may not use classpaths, can also be used to retrieve program-specific variable definitions from databases and directories. Class loaders may also reference not only files, but Internet resources via URLs (uniform resource locators). Further, OSGi (an open standard organization) framework allows for Java™ modules to employ a very expressive classpath specification.

In another embodiment, locating installation specific parameters of step 104 may include locating the files that a given program reads as discovered by the static analysis. For instance, in the examples with a ".xml" file and a ".ini" file above, the file read is determined by this code statement:

Document xmldocument=builder.parse("variables.xml"); and

FileReader iniFileReader=new FileReader("notes.ini"); respectively, and thus the method would try to locate files "variables.xml" and "notes.ini", respectively, in the current working directory of the process. On UNIX-like systems the current working directory of the process can be obtained from the "/proc/<PID>/cwd" file. The path to the file can also be absolute, e.g. "/etc/conf.d/notes.ini". In this case, the location of the file can be discovered purely by static analysis without any additional information, such as command-line arguments or current working directory of the process.

This approach may use recursion of the whole algorithm: e.g., to resolve a variable A, resolve a file name variable F of the file where A is defined. For instance, in the XML file example above, instead of the line "Document xmldocument=builder.parse("variables.xml");" there might be the following line:

Document xmldocument=builder.parse(variables_file); where the variable "variables_file" is initiated from a properties file as follows:

basefileproperties.load(new FileInputStream("basefiles.properties"));

variables_file=basefileproperties.getProperty("variables_file"));

and where the file "basefiles.properties" contains a line variables_file=variables.xml;

Hence, while analyzing for the set of possible values of the program variables or the like, which depends on the parameter WMM_CONFIG_PATH in "variables.xml", the method encounters the variable "variables_file", and the overall method (from Step 102 to 108) is called recursively to first determine the set of possible values of "variables_file" in the program statement "Document xmldocument=builder.parse (variables_file)". Once that is done and the result {"variables.xml"} has been obtained, the outer method proceeds as in the simpler example where the string "variables.xml" was a constant input to the method "builder.parse". In practice such a recursive use of properties and configuration files is not unusual.

At 106, the method parses these repositories locations discovered in step 104, and extracts necessary configuration parameters. In the above example program "DB_use.java", the method and system of the present disclosure in one embodiment may look for the property "WWW_DB" that defines the variable "database_name." Configuration-information parsing may be based on the detected or predicted file format. For example, Java™ property files have a well-defined format of name-value pairs that is known in advance. Similarly, IBM Websphere™ Application Server (WAS) v.3 parameters are stored in a database with a known schema.

In one embodiment, the parsing in step 106 may be done by a set of special-purpose subprograms that we call configuration evaluators, one for each type of standard property files. For instance, a configuration evaluator for command line arguments knows how to parse the output file of a "ps" command for the line corresponding to a specific program, and that line for the arguments of that program, as we demonstrated in the example above.

For example, a configuration evaluator for property files searches for lines of the form "X=Y" or the like, (e.g., with certain variations as defined by the standard for Java™ property files, e.g., also "X=Y" and "X:Y"), where X is the name of the property, i.e., the search string, and Y is the value of the property, i.e., the desired result. In one embodiment, if there are several possible results in the properties files determined in step 104, the configuration evaluator returns a list of the possible values. The system and method of the present disclosure overall allows other formats such as a regular expression. In another embodiment, the configuration evaluator for Java™ property files may emulate the order in which the Java™ environment would search the property files at runtime, e.g., in the order in which the locations are listed in the classpath, and determine the precise value of the environment parameter for the program even if there are several properties files with such a parameter, or one property file with several definitions for the parameter.

It is conceivable in the overall method that instead of using a special configuration evaluator that gets a property name and a property file as an input, one considers the code that implements the Java™ API for properties still as part of the source code and analyses it within step 102, i.e., as part of the static analysis. In this case, e.g., the variable "database_name" maybe be treated as a complex substring expression (as given by Java's own interpretation of a properties file) based on the string with the entire content of the properties file, and the configuration evaluator is reduced to retrieving this entire content. In general, for any type of resource (not only for properties files), one can implement static analysis plug-ins. Each plug-in may emulate the Java's interpretation of a specific resource (properties files, xml properties, ini files, etc.). In this case, the static analysis engine populated with plug-in functions performs configuration evaluation and configuration parameter substitution right within the step 102.

An interesting variation to step 106 are configuration files as they occur for scripting languages such as perl and shellscript, written in these languages themselves. For example, consider a configuration file with the following two lines:

```
INSTALL_PATH=/qqq
CONFIG_PATH=${INSTALL_PATH}/config
```

Here, once the location of this file has been found as in step 104, one can use string analysis for these languages to parse the file and derive resulting parameters, e.g., to derive that "CONFIG_PATH" is /qqq/config in this case. Similarly, attributes defined in an XML configuration file may refer other attributes defined in this file, e.g.

```
<xmlconfig>
    <configfile_main id="x">/qqq/config</configfile_main>
    <configfile_extra ref="x"/>
</xmlconfig>
```

Here, one can use XML parsing engine to derive "configfile_extra" attribute value, e.g. "/qqq/config" in this case.

At 108, the extracted configuration parameters are substituted into the expressions or grammars obtained in step 102 by substituting variables with their values. In the first example, this is the final substitution of ARGV[2]*ARGV[3] by the values 7 and 12, and evaluating it to 84. In the example where the abstract interpretation after step 102 was "wwwroot+'/contact.html'", assume step 106 found in the relevant property files (from step 104) that "wwwroot=C:/inetpub/wwwroot/privateserver". Step 108 substitutes that expression into the abstract interpretation and evaluates the string concatenation (the "+" sign) to the single string "C:/inetpub/wwwroot/privateserver/contact.html".

Sometimes the result of this substitution will still be an abstract interpretation, if not all parts of the expression from step 102 could be resolved in this way, e.g., if one part of the expression is read from standard input at runtime. These remaining variables can be substituted by the wildcard "*" (meaning an arbitrary value) in order to obtain a set of possible values without variables. Besides describing this set of possible values as a list, it may be described as an expression, in particular for strings it may be described as a regular expression or a CFG (context-free grammar).

Figure 2:
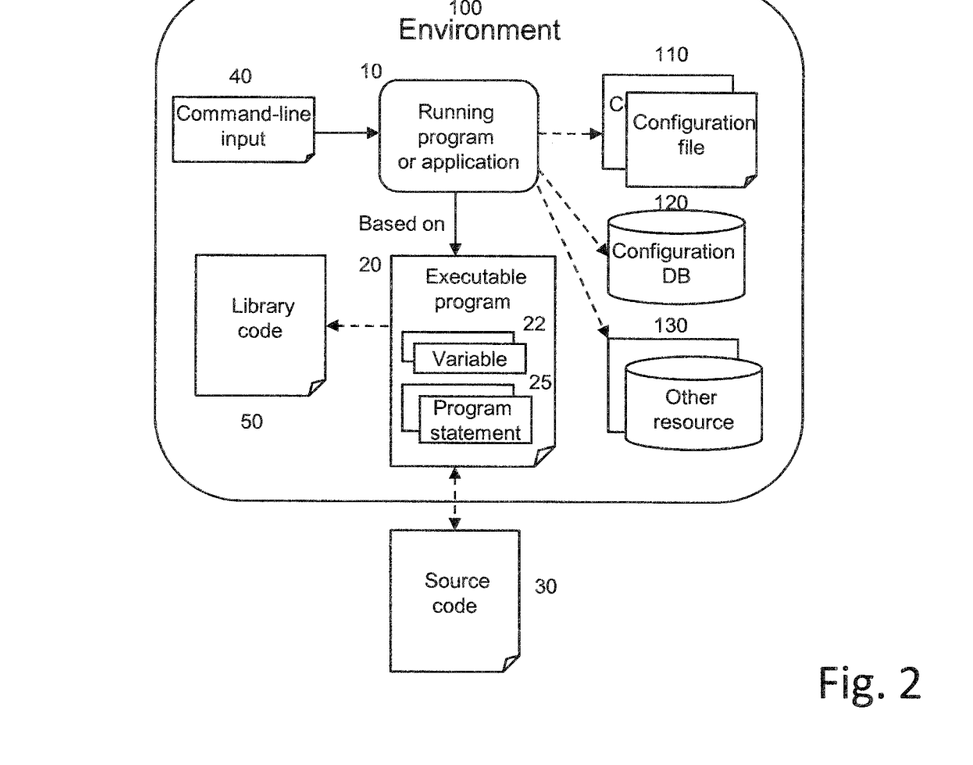
FIG. 2 is a system architecture diagram illustrating a program and its environment.

FIG. 2 is a system architecture diagram illustrating a program and its environment. A program environment 100 in one aspect may have a running program or application 10 that is running an executable program 20. A command-line input 40, for instance, may start the running of the program 10. The executable program 20 may include a number of program variables 22 and program statements 25. The executable program 20 may be compiled or generated from a source code 30 and may also utilize library code 50. The running program 10 may access and utilize one or more of configuration files 110, configuration database 120 and other resources 130, and various data or parameters stored or specified therein.

Figure 3:
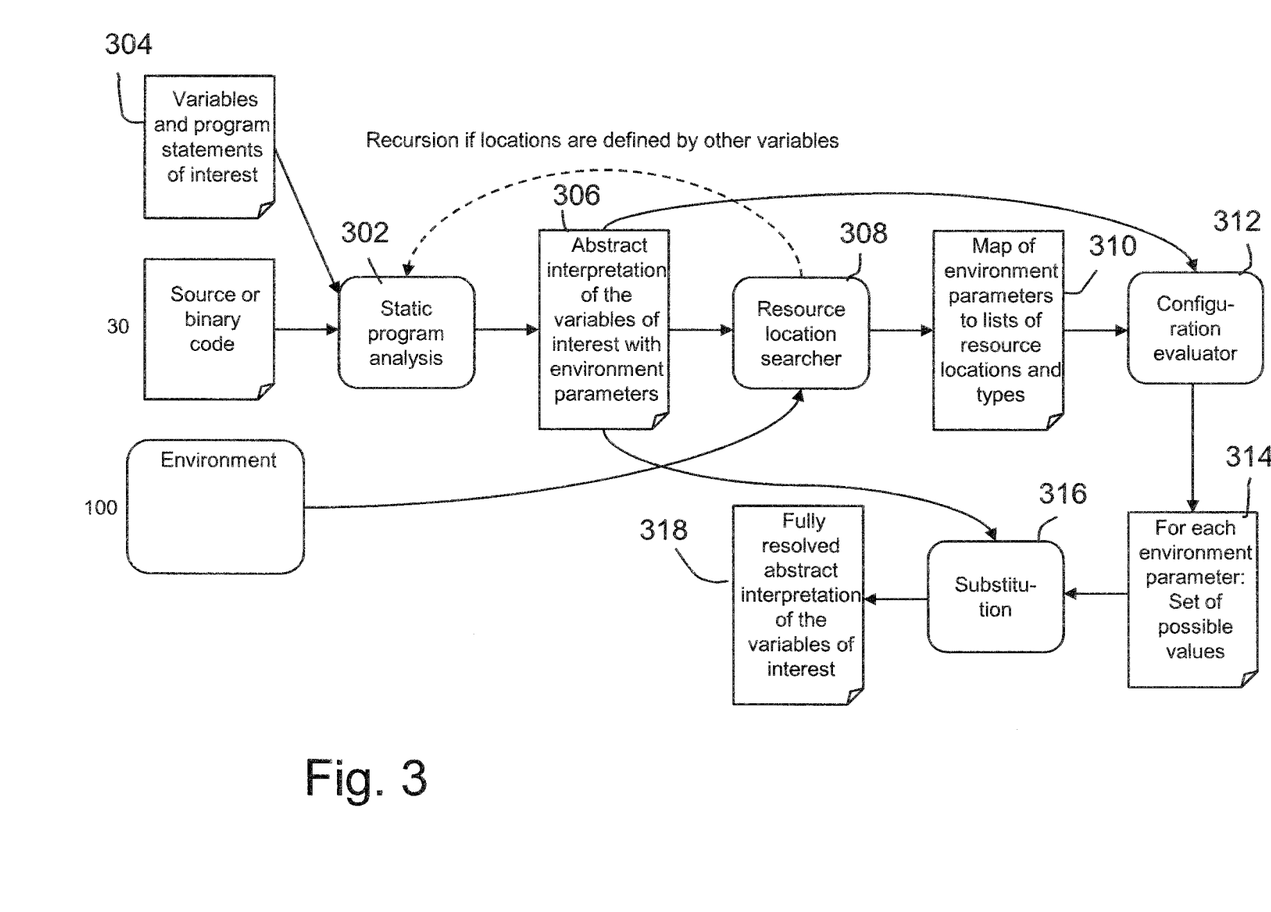
FIG. 3 is a diagram illustrating example functional or logical components of the present disclosure in one embodiment.

FIG. 3 is a diagram illustrating example functional or logical components of the present disclosure in one embodiment. A static program analysis module 302 may perform static analysis on the source or binary code 30 for variables and program statements of interest 304. An abstract interpretation 306 of the variables and program statements of interest obtained from the static program analysis module 302 is further enhanced by a resource location searcher 308 that discovers locations of installation-specific parameters associated with the program 30 using information about the environment 100 in which an executable of the program 30 is running. The resource location searcher 308 may further provide a map of environment parameters 310 that list resource locations and types. A configuration evaluator 312 parses the information in the resource locations and extracts set of possible values 314. A substitution module 316 substitutes the possible values into the abstract interpretation and resolves the abstract interpretation of the variables and program statements of interest 318.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like, conventional procedural programming languages, such as the "C" programming language or the like, and scripting languages, such as Perl or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
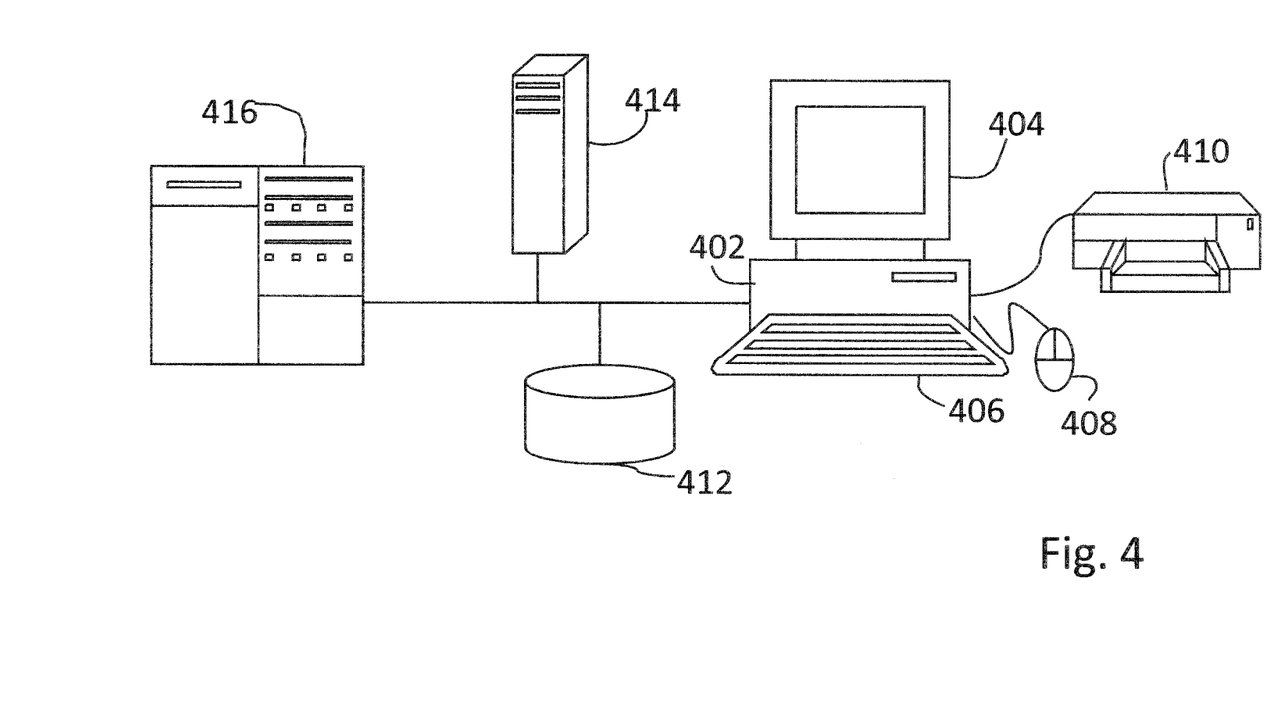
FIG. 4 shows an example of a computer system which may carry out the system and method of the present disclosure.

Referring now to FIG. 4, the systems and methodologies of the present disclosure may be carried out or executed in a computer system 402 that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 404 for presenting output displays and providing a display through which the user may input data and interact with the processing system, for instance, in cooperation with input devices such as the keyboard 406 and mouse device 408 or pointing device. The computer processing system may be also connected or coupled to one or more peripheral devices such as the printer 410, scanner (not shown), speaker, and any other devices, directly or via remote connections. The computer processing system may be connected or coupled to one or more other processing systems such as a server 410, other remote computer processing system 414, network storage devices 412, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 402, 414, 416), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for discovering one or more program variable values, comprising:
    extracting an abstract interpretation of a program variable used in a computer program, the abstract interpretation being an expression that has not been completely resolved into definitive values, and the program variable taking a set of values during the execution of the computer program;
    locating installation-specific repositories associated with the computer program, the installation-specific repositories comprising at least a listing of running processes with one or more command lines that invoked the computer program;
    parsing the located installation-specific repositories and extracting one or more configuration parameters;
    substituting the one or more configuration parameters into the extracted abstract interpretation to provide the extracted abstract interpretation with one or more values; and
    resolving the program variable using the one or more values,
    wherein a set of all possible values of the program variable is approximated by combining static program analysis and extraction of the configuration parameters.

2. The method of claim 1, wherein the extracting step includes extracting an abstract interpretation of a program variable using static analysis.

3. The method of claim 1, wherein an environment of the computer program includes execution environment of the computer program.

4. The method of claim 1, wherein the installation-specific repositories include command line arguments, configuration files, databases, or one or more repositories of configuration parameters, or combinations thereof.

5. The method of claim 1, wherein the locating installation-specific repositories includes using knowledge associated with execution environment of the computer program.

6. The method of claim 1, wherein the locating installation-specific repositories includes locating one or more files the computer program reads, one or more environment variables the computer program uses, one or more databases the computer program accesses, and one or more command line arguments the computer program takes.

7. A non-transitory program storage device readable by a machine, tangibly embodying a program of instructions executable by the machine to perform a method of discovering one or more program variable values, comprising:

extracting an abstract interpretation of a program variable used in a computer program, the abstract interpretation being an expression that has not been completely resolved into definitive values, and the program variable taking a set of values during the execution of the computer program;

locating installation-specific repositories associated with the computer program, the installation-specific repositories comprising at least a listing of running processes with one or more command lines that invoked the computer program;

parsing the located installation-specific repositories and extracting one or more configuration parameters;

substituting the one or more configuration parameters into the extracted abstract interpretation to provide the extracted abstract interpretation with one or more values; and resolving the program variable using the one or more values, wherein a set of all possible values of the program variable is approximated by combining static program analysis and extraction of the configuration parameters.

8. The program storage device of claim 7, wherein the extracting step includes extracting an abstract interpretation of a program variable using static analysis.

9. The program storage device of claim 7, wherein an environment of the computer program includes execution environment of the computer program.

10. The program storage device of claim 7, wherein the installation-specific repositories include command line arguments, configuration files, databases, or one or more repositories of configuration parameters, or combinations thereof.

11. The program storage device of claim 7, wherein the locating installation-specific repositories includes using knowledge associated with execution environment of the computer program.

12. The program storage device of claim 7, wherein the locating installation-specific repositories includes locating one or more files the computer program reads, one or more environment variables the computer program uses, one or more databases the computer program accesses, and one or more command line arguments the computer program takes.

13. A system for discovering one or more program variable values, comprising:

a processor;

a static analysis module configured to execute on the processor and further configured to extract an abstract interpretation of a program variable used in a computer program, the abstract interpretation being an expression that has not been completely resolved into definitive values, and the program variable taking a set of values during the execution of the computer program;

a resource location searcher module configured to locate installation-specific repositories associated with the computer program, the installation-specific repositories comprising at least a listing of running processes with one or more command lines that invoked the computer program;

a configuration evaluator configured to parse the located installation-specific repositories and extract one or more configuration parameters; and a substitution module configured to substitute the one or more configuration parameters into the extracted abstract interpretation to provide the extracted abstract interpretation with one or more values, wherein the program variable is resolved using the one or more values and a set of variable values that the program variable can assume is determined, wherein a set of possible values of the program variable is approximated by combining static program analysis and extraction of the configuration parameters.

14. The system of claim 13, wherein an environment of the computer program includes execution environment of the computer program.

15. The system of claim 13, wherein the installation-specific repositories include command line arguments, configuration files, databases, or one or more repositories of configuration parameters, or combinations thereof.

16. The system of claim 13, wherein the resource location searcher uses knowledge associated with execution environment of the computer program to locate installation-specific repositories.

17. The system of claim 13, wherein the resource location searcher locates one or more files the computer program reads, one or more environment variables the computer program uses, one or more databases the computer program accesses, and one or more command line arguments the computer program takes to locate installation-specific repositories.

* * * * *